July 27, 1926.

R. W. VENABLE

CONFECTION

Filed Feb. 12, 1923

1,593,858

Inventor:
Robert W. Venable
By
Attorneys

Patented July 27, 1926.

1,593,858

UNITED STATES PATENT OFFICE.

ROBERT W. VENABLE, OF ROMEO, MICHIGAN.

CONFECTION.

Application filed February 12, 1923. Serial No. 618,524.

This invention relates to a confection and has special reference to that class of frozen edible materials incased in a protective confection coating. A sample of such confection is a quantity of ice cream having a chocolate encasement, and if care is not exercised in eating the confection it will slip from its wrapper, soil the fingers or clothing, and at the best render eating somewhat difficult.

My invention aims to provide a confection of the above class with a handle or stick which will facilitate manipulating the confection, and the handle or stick is constructed so that a frozen confection will adhere thereto, also, so that an advertisement may be used in connection with the handle.

My improvement will be hereinafter described and then claimed and reference will now be had to the drawing, wherein—

Figures 1, 2, 3, 4, 5:
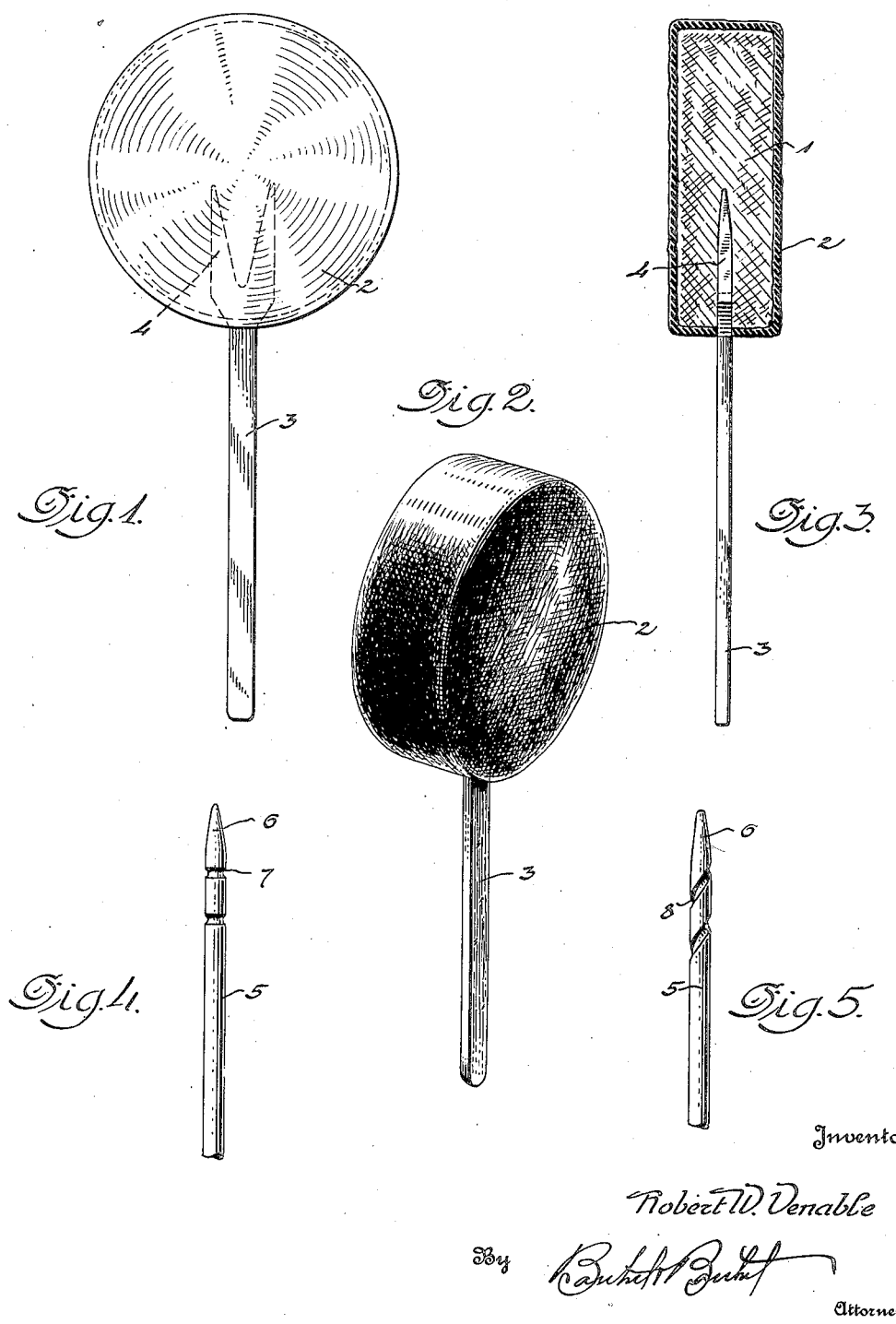
Figure 1 is a front elevation of a confection on a handle.
Fig. 2 is a perspective view of the same.
Fig. 3 is a vertical sectional view of the confection provided with a handle.
Fig. 4 is a side elevation of a portion of a handle or stick roughened to cause a confection to adhere thereto.
Fig. 5 is a similar view of another form of handle or stick.

The reference numeral 1 denotes a frozen confection, as ice cream, having a configuration of a thick disk, drum or cylinder. Obviously it may be of any other shape.

2 is a protective coating, as chocolate encasing the ice cream, and between the chocolate and the ice cream is the usual cocoa butter film affording a non-absorbent interior lining for the chocolate coating 2.

3 is a handle or stick having facets or walls on which advertisements may be placed and one form of the handle or stick has tines or projections 4 forming a pronged head to which the ice cream may adhere without any danger of the frozen confection becoming displaced relative to the handle or stick while being eaten. The ice cream may be frozen about the tines 4 or the tines may be inserted in the ice cream after being frozen. Then again, ice cream may be pressed about the tines and since there may be other ways of mounting the edible frozen material on the handle or stick, I do not care to confine my invention to any particular mounting.

In lieu of the tined handle or fork I may use a stick 5 pointed, as at 6, so that it may be easily inserted in the ice cream. The stick may have circumferential grooves 7 or a spiral groove 8, or any serrated or roughened surface which will cause the ice cream to adhere to the outer end of the stick.

In lieu of ice cream or chocolate I may use a farinaceous material and it is obvious that the handle or stick can be made of any unexpensive material that will not affect the confection or edible material mounted on the outer end of the handle or stick.

What I claim is:—

Means adapted to facilitate handling a confection and which means forms part of the confection until the confection is consumed, said means comprising a wide stick having flat diverging tines about which the confection is formed with the confection enclosing the tines, said stick having a handle portion extending from a wall of the confection and provided with facets throughout the length thereof and in the same plane as said flat tines and upon which handle facets advertisements may be placed.

In testimony whereof I affix my signature.

ROBERT W. VENABLE.